United States Patent
Celi, Jr. et al.

(10) Patent No.: US 7,251,319 B2
(45) Date of Patent: Jul. 31, 2007

(54) METHOD AND SYSTEM FOR APPLICATION INITIATED TELECONFERENCING

(75) Inventors: Joseph Celi, Jr., Boca Raton, FL (US); Peeyush Jaiswal, Boca Raton, FL (US); Victor S. Moore, Boynton Beach, FL (US)

(73) Assignee: International Business Machines Corporations, Armonk, NY (US)

( * ) Notice: Subject to any disclaimer, the term of this patent is extended or adjusted under 35 U.S.C. 154(b) by 800 days.

(21) Appl. No.: 10/003,789

(22) Filed: Nov. 15, 2001

(65) Prior Publication Data

US 2003/0091175 A1  May 15, 2003

(51) Int. Cl.
*H04M 3/42* (2006.01)

(52) U.S. Cl. ................. 379/202.01; 370/260; 709/204; 709/205

(58) Field of Classification Search ........... 379/202.01; 370/260; 709/204, 205
See application file for complete search history.

(56) References Cited

U.S. PATENT DOCUMENTS

| | | | | |
|---|---|---|---|---|
| 5,623,539 A * | 4/1997 | Bassenyemukasa et al. | ..... | 379/88.02 |
| 5,889,945 A | 3/1999 | Porter et al. | ................. | 709/204 |
| 5,916,302 A | 6/1999 | Dunn et al. | .................. | 709/204 |
| 5,995,608 A | 11/1999 | Detampel, Jr. et al. | . | 379/205.01 |
| 6,154,463 A | 11/2000 | Aggarwal et al. | ........... | 370/408 |
| 6,167,432 A | 12/2000 | Jiang | .......................... | 709/204 |
| 6,175,619 B1 | 1/2001 | DeSimone | ............. | 379/202.01 |
| 6,178,237 B1 * | 1/2001 | Horn | .......................... | 379/202 |
| 6,188,676 B1 | 2/2001 | Pirich | ......................... | 370/261 |
| 6,219,412 B1 | 4/2001 | Wellner et al. | ......... | 379/202.01 |
| 6,233,605 B1 | 5/2001 | Watson | ....................... | 709/204 |
| 6,269,159 B1 | 7/2001 | Cannon et al. | ......... | 379/202.01 |
| 6,272,214 B1 | 8/2001 | Jonsson | ................. | 379/202.01 |
| 6,424,945 B1 * | 7/2002 | Sorsa | ....................... | 704/270.1 |
| 6,535,730 B1 * | 3/2003 | Chow et al. | ................ | 455/416 |
| 6,560,576 B1 * | 5/2003 | Cohen et al. | ............... | 704/270 |
| 6,625,271 B1 * | 9/2003 | O'Malley et al. | ...... | 379/202.01 |
| 6,765,931 B1 * | 7/2004 | Rabenko et al. | ............ | 370/493 |
| 6,792,092 B1 * | 9/2004 | Michalewicz | ............... | 370/263 |
| 2001/0016038 A1 | 8/2001 | Sammon et al. | ....... | 379/202.01 |
| 2002/0118808 A1 * | 8/2002 | Kelleher et al. | | |

FOREIGN PATENT DOCUMENTS

WO    WO98/59461    12/1998

OTHER PUBLICATIONS

S. Vujosevic, et al., VoxML: Get Your Database Talking, *WEB Techniques*, vol. 6, No. 2, pp. 51-55 (Feb. 2001).
D. Houlding, VoiceXML and the Voice-Driven Internet, *Dr. Dobb's Journal*, vol. 26, No. 4, pp. 88-95, (Apr. 2001).
P.J. Danielsen, The Promise of a "Voice-Eanbled Web", *Computer*, vol. 33, No. 8, pp. 104-106, (Aug. 2000).
C. Comaniciu, et al., Admission and Flow Control for Multimedia CDMA, *Latest Advances in the Fast Changing World of Multimedia*, Part vol. 3, pp. 1265-1268, 2000 IEEE Int'l. Conference on Multimedia and Expo, (2000).

* cited by examiner

*Primary Examiner*—Quynh H. Nguyen
(74) *Attorney, Agent, or Firm*—Akerman Senterfitt

(57) ABSTRACT

A method of call conferencing using a voice browser can include establishing a voice browsing session between a calling party and the voice browser, and conferencing an additional party into the voice browsing session. The conference can provide a voice communications link between the calling party and the additional party.

14 Claims, 2 Drawing Sheets

METHOD AND SYSTEM FOR APPLICATION INITIATED TELECONFERENCING

BACKGROUND OF THE INVENTION

1. Technical Field

The present invention relates to multiplexed telephonic communications, and more particularly, to multi-party voice browsing sessions.

2. Description of the Related Art

The Voice Extensible Markup Language (VoiceXML) is a markup language useful in the creation and management of computer-human dialogs. VoiceXML capitalizes on existing telephony, markup language and data communications network technologies to facilitate user interaction with various speech-enabled services. In consequence, VoiceXML brings the advantages of Web-based development and content delivery to interactive voice response applications.

For example, VoiceXML can support features such as the playback of synthesized speech, digitized speech or audio, speech recognition, recognition of dual tone multi-frequency (DTMF) key input, as well as the recording of a speech input. Moreover, since VoiceXML leverages existing telephony and Internet technologies, no specialized access device is required for accessing online content. Thus, a caller can initiate a voice browsing session with a VoiceXML application and can interact with the VoiceXML application to perform selected tasks or to access online content.

Although VoiceXML provides voice application developers with access to a substantial feature set, several deficiencies have been associated with the conventional deployment of VoiceXML solutions. For instance, presently, the VoiceXML specification does not provide a mechanism in which additional callers can access an established voice browsing session. Rather, to conference additional callers into an established voice browsing session, specialized hardware and software can be required.

SUMMARY OF THE INVENTION

The invention disclosed herein provides a method for conferencing additional callers into an established voice browsing session. In particular, additional callers can be added to an existing voice browsing session using technology disposed at the application level rather than at the hardware level. When additional callers have been added to the established voice browsing session, requests originating from all conference participants, can be processed by the voice browser handling the voice browsing session. Moreover, the conference participants both can communicate with one another over a voice link, and also can receive audio from the voice browser.

One aspect of the present invention can include a voice browser based call conferencing method. The method can include establishing a voice browsing session between a calling party and the voice browser. An additional party can be conferenced into the voice browsing session. The conference can provide a voice communications link between the calling party and the additional party. Notably, the conferencing step can conference selected ones of a plurality of additional parties into the voice browsing session.

The method can include providing an identifier associated with the additional party from the voice browser to the conferencing component and initiating an outbound call from the conferencing component to the additional party. If the outbound call is successful, the conferencing step further can include aggregating a voice data stream of the additional party with a voice data stream of the calling party into a single voice data stream, and sending the single voice data stream for processing to the voice browser. The conferencing step also can include sending audio from the voice browser to the calling party and the additional party.

Another aspect of the invention can include a speech processing system. The speech processing system can include a call processing system configured to establish a telephone call with a calling party and establish another telephone call with at least one called party. The voice processing system further can include a voice data stream manager. The voice data stream manager can be configured to aggregate a voice data stream of the calling party and a voice data stream of the called party into a single voice stream, as well as selectively route at least one of the voice data streams to at least one voice browser. The voice data stream manager further can include a discriminator configured to discriminate between a voice data stream of the calling party and a voice data stream of the additional party from within the single voice data stream.

The voice processing system also can include a voice browser which can be configured to provide the single voice data stream to at least one voice browser application. The voice browser can selectively route audio from the voice browser to the calling party, any additional parties, or any combination thereof.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE INVENTION

The invention disclosed herein provides a method and system for conferencing additional callers into a voice browsing session which has been established between an initial caller and a voice browser. In particular, an additional caller can be added to an existing voice browsing session by initiating an outbound call from within the voice browsing session to the additional caller whose addition is desired. In this way, participants in a voice browsing session can conference additional callers at will using application level components without requiring expensive hardware add-ons.

For example, responsive to a caller request to add an additional party to an established voice browsing session in which the caller presently participates, the directory number of the additional caller can be provided from the voice browser to a conferencing component which then can initiate the call. The directory number can, for example, be included within a speech application such as an operator help line, or can be provided by the caller. In any case, if the outbound call is successful, the additional caller can be included within the existing call and voice browsing session.

Upon successfully adding the outbound call to the existing voice browsing session, the voice data stream of the additional caller can be coordinated with the voice data stream of the initial caller. For example, audio from the various conference call participants can be aggregated into a single voice data stream that can be directed to an appropriate voice browser or voice browser application. Additionally, audio from the voice browser can be provided to each conference call participant or to selected participants. In any case, subsequent to adding the additional callers to the existing voice browsing session, requests originating from any of the conference call participants can be processed by the voice browser.

Figure 1:
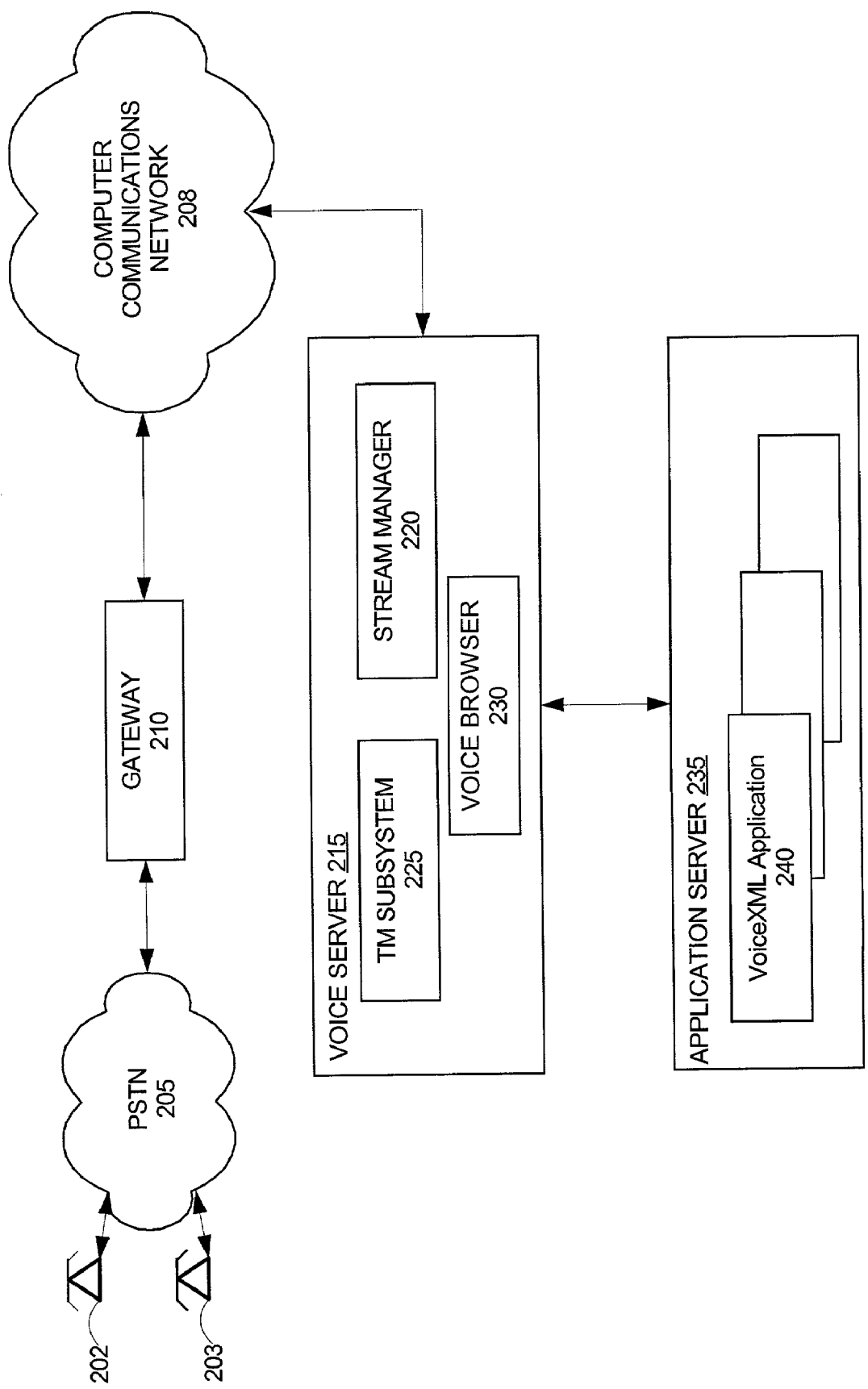
FIG. 1 is a block diagram of a speech processing system which has been configured to handle a voice browsing session in accordance with the inventive arrangements disclosed herein; and, FIG. 2 is a flow chart illustrating the call conferencing method of the present invention.

FIG. 1 is a block diagram of a speech processing system in accordance with one aspect of the inventive arrangements disclosed herein. Referring to FIG. 1, the speech processing system can include a public switched telephone network (PSTN) 205, a computer communications network 208, a gateway 210, a voice server 215, and an application server 235. Callers can initiate telephone calls or other voice communications via telephones 202 and 203 which are communicatively linked to the PSTN 205. Although telephones 202 and 203 are shown in FIG. 1, any of a variety of communications devices capable of functioning as a speech interface such as voice-enabled personal digital assistants, wireless telephones, cellular telephones, or the like can be communicatively linked to the PSTN 205.

The gateway 210 can be a voice over IP (VoIP) gateway, a voice extensible markup language (VoiceXML) gateway/server, or other suitable networking device which can communicatively link the computer communications network 208, for example the Internet, with the PSTN 205. The voice server 215, which can be communicatively linked to the computer communications network 208, can include a telephony and media (TM) component 225, a voice data stream manager 220 and a voice browser 230. The voice server 215 further can include multiple instances of the TM component 225, the voice data stream manager 220, and the voice browser 230. Voice server 215 can be configured to provide automatic speech recognition, text-to-speech, audio, as well as dual tone multi-frequency processing and generation. Alternatively, one or more of these functions can be integrated within the gateway 210.

The TM component 225 can be configured to manage call control including receipt of inbound calls as well as call setup, maintenance, and termination of calls between one or more callers to be teleconferenced and included within a voice browsing session of the voice browser 230. The TM component 225 can route audio from the voice browser to one or more of the callers engaged in the conference call and voice browsing session. For example, audio can be routed to selected individual callers or to all callers.

The voice data stream manager 220 can coordinate the various voice data streams between multiple callers engaged in the telephone conference call and participating in the voice browsing session. The voice data stream manager 220 can be configured to aggregate the various voice data streams from each caller engaged in the conference call and voice browsing session, as well as route the aggregated data stream to one or more selected application programs in the application server 235. The voice data stream manager 220 can discriminate among the voice data streams within the aggregated voice data stream to selectively route particular voice data streams to selected application programs. Still, it should be appreciated that callers involved in the conference call and voice browsing session can communicate among themselves via one or more communications links established through the PSTN 205.

The voice browser 230 can process markup languages, such as VoiceXML, which can specify computer-human dialogs. Accordingly, the voice browser 230 can receive audio input and provide audio output. Notably, the voice browser 230 can be configured to process voice data streams from multiple callers that have been aggregated into a single data stream by the data stream manager 220.

The application server 235 can be communicatively linked to the voice server 215 as shown in FIG. 1. Alternatively, the application server 235 can be communicatively linked through the computer communications network 208.

The application server 235 can include one or more applications, such as VoiceXML applications 240, which can be executed by the voice browser 230. Those skilled in the art will recognize that the application programs 240 can be included within the voice server 215.

Figure 2:
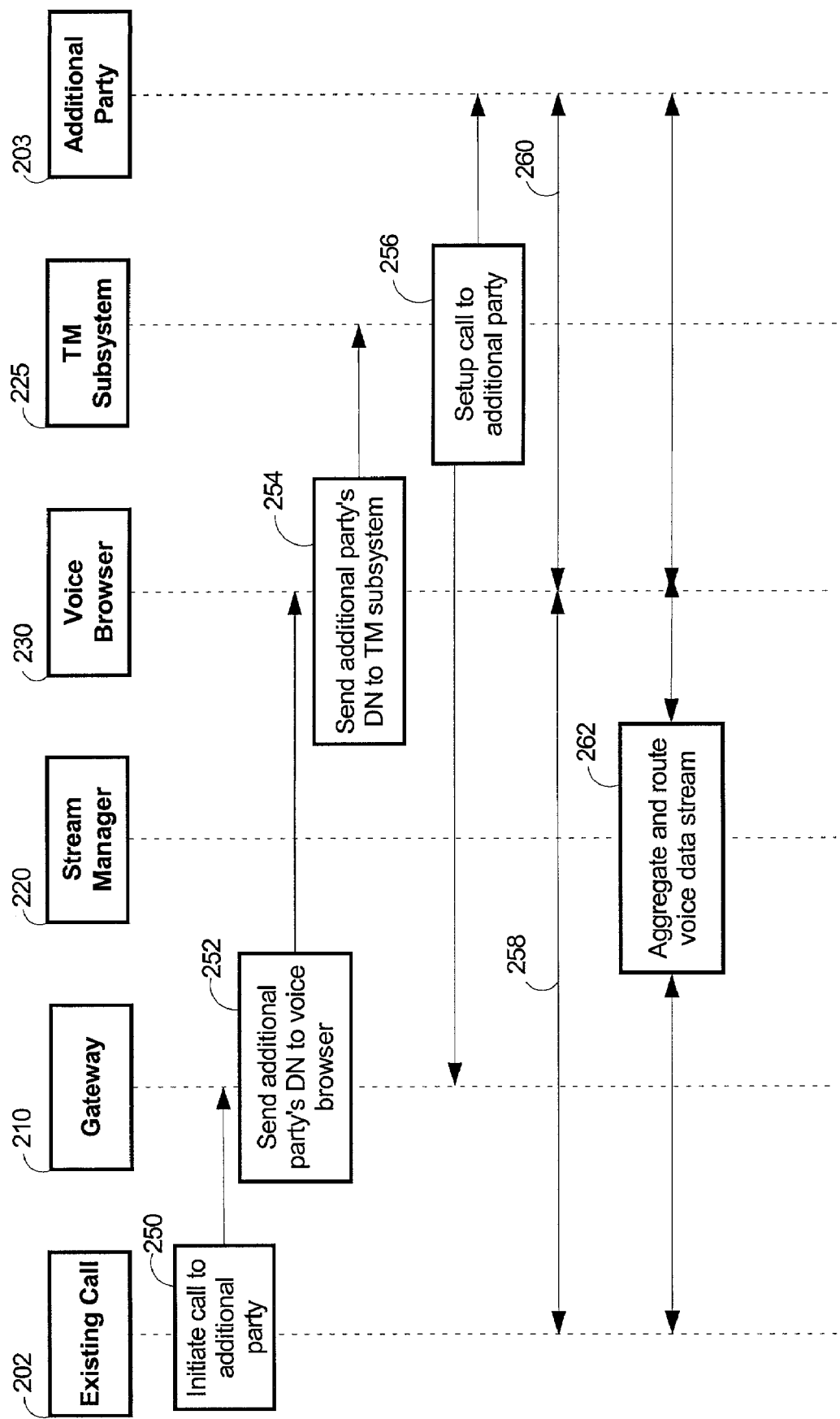

FIG. 2 is an exemplary call flow diagram illustrating one method of operation of the speech processing system of FIG. 1. The call flow diagram can begin in a state wherein an existing call 202 has been established between a caller and a voice browser 230. Accordingly, in step 250, a party to an existing call 202 can initiate a call to an additional party 203. Gateway 210 can receive a request to initiate an outbound call. In step 252, the additional party's DN can be sent to the voice browser 230. It should be appreciated, however, that the DN of the additional party can be stored or programmed within a speech application to be executed by the voice browser or programmed within the voice browser itself. For example, the caller can interact with the voice browser 230 and select an option by saying "help", which can initiate an outbound call to a an operator to be conferenced into the existing call and voice browsing session.

In any case, upon receipt of the additional party's DN, the voice browser 230 can request that the TM subsystem 225 setup the call to the additional party 203. In step 254, as part of the setup process, the voice browser 230 can send the called party's DN to the TM subsystem 225. In response to the call setup request, in step 256, the TM subsystem can initiate an outbound call to the additional party 203 and send a notification to gateway 210. Steps 258 and 260 illustrate the additional party 203 being added to the existing call 202, as well as being added to the existing voice browsing session with the voice browser 230.

In step 262, the voice data stream manager 220 can aggregate the voice data streams from callers 202 and 203 and route the aggregated voice data stream to an appropriate voice browser or voice browser application. Additionally, audio from the voice browser 230 can be selectively routed to caller 202, 203, or any other callers which have been conferenced into the call and voice browsing session. Still, as mentioned, callers 202 and 203 can communicate with one another through a voice link over the PSTN for example. After including any additional callers the conference call and existing voice browsing session, each of the conference call participants can interact with the voice browser 230.

The present invention can be realized in software in a centralized fashion in one computer system, or in a distributed fashion where different elements are spread across several interconnected computer systems. Any kind of computer system or other apparatus adapted for carrying out the methods described herein is suited. A typical implementation can include a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method of call conferencing using a voice browser comprising:

establishing a voice browsing session between a calling party and the voice browser provided by a voice server that interfaces with a telephony network via a gateway;

establishing a conference to conference at least one additional party into said voice browsing session using an application level component, said conference providing a voice communications link between said calling party and said at least one additional party established via the telephony network;

providing an identifier associated with said at least one additional party from the voice browser to an additional application level component, wherein the additional application level component marks a voice data stream of the at least one additional party with the identifier for routing;

dynamically coordinating voice data streams between said calling party and said at least one additional party with the additional application level component defining a voice data stream manager using identifiers to thereby generate a single voice data stream by aggregating a voice data stream having a first identifier of said additional party with a voice data stream having a second identifier of said calling party into a single voice data stream; and sending said single voice data stream with identifiers for processing to the voice browser, wherein the data stream manager aggregates the voice data streams by identifiers to generate the single voice data stream and selectively routes audio from the voice browser to said calling party based on the identifiers.

2. The method of claim 1, wherein said establishing a conference step conferences selected ones of a plurality of additional parties into said voice browsing session and wherein the application level component is a voice markup application.

3. The method of claim 1, wherein said establishing a conference step comprises:

initiating an outbound call from the conferencing component to said additional party.

4. The method of claim 3, wherein said establishing a conference step further comprises:

sending audio from the voice browser to said calling party and said additional party.

5. The method of claim 1, wherein said establishing a conference step occurs within a VoiceXML programming environment.

6. A speech processing system comprising:

a voice browser;

a call processing system configured to establish a telephone call with a calling party, to establish another telephone call with at least one called party, and to route audio between said voice browser and each of said calling party and said at least one called party during a combined conference call and voice browsing session using identifiers that mark voice data streams for selection; and an application level component defining a voice data stream manager for coordinating voice data streams for each of said calling party and at least one called party during the combined conference call and voice browsing session, the coordinated voice data streams being aggregated into a single voice data stream using identifiers that mark voice data streams for route selection.

7. The system of claim 6, wherein said voice data stream manager further comprises a discriminator configured to discriminate between a voice data stream having a first identifier of said calling party and a voice data stream having a second identifier of said additional party from within said single voice data stream, and to selectively route at least one of said voice data streams to at least one voice browser application based on the first identifier and second identifier.

8. The system of claim 6, wherein said voice browser is configured to programmatically execute VoiceXML commands.

9. A computer-readable medium, having stored thereon a computer program having a plurality of code sections executable by a computer for causing the computer to perform the steps of:

establishing a voice browsing session between a calling party and the voice browser provided by a voice server that interfaces with a telephony network via a gateway;

establishing a conference to conference at least one additional party into said voice browsing session using an application level component, said conference providing a voice communications link between said calling party and said at least one additional party established via the telephony network; and providing an identifier associated with said at least one additional party from the voice browser to an additional application level component, wherein the additional application level component marks a voice data stream of the at least one additional party with the identifier for routing;

dynamically aggregating voice data streams between said calling party and said at least one additional party with an additional application level component defining a voice data stream manager that uses identifiers to generate a single voice data stream, and selectively routes audio from the voice browser to said calling party based on the identifiers.

10. The computer-readable medium of claim 9, wherein said establishing a conference step conferences selected ones of a plurality of additional parties into said voice browsing session, and wherein the application level component is a voice markup application.

11. The computer-readable medium of claim 9, wherein said establishing a conference step comprises:

providing an identifier associated with said additional party from the voice browser to the conferencing component; and initiating an outbound call from the conferencing component to said additional party.

12. The computer-readable medium of claim 11, wherein said establishing a conference step further comprises:

sending said single voice data stream for processing to the voice browser.

13. The computer-readable medium of claim 11, wherein said establishing a conference step further comprises:

sending audio from the voice browser to said calling party and said additional party.

14. The computer-readable medium of claim 9, wherein said establishing a conference step occurs within a VoiceXML programming environment.

* * * * *